(12) United States Patent
Hitotsumatsu et al.

(10) Patent No.: US 11,032,681 B2
(45) Date of Patent: Jun. 8, 2021

(54) DEVICE, METHOD, AND COMPUTER PROGRAM PRODUCT FOR VEHICLE COMMUNICATION

(71) Applicant: DENSO CORPORATION, Kariya (JP)

(72) Inventors: Takafumi Hitotsumatsu, Kariya (JP); Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/449,795

(22) Filed: Jun. 24, 2019

(65) Prior Publication Data

US 2019/0394626 A1    Dec. 26, 2019

(30) Foreign Application Priority Data

Jun. 26, 2018 (JP) .............................. JP2018-120953

(51) Int. Cl.
*H04W 4/44* (2018.01)
*H04W 4/70* (2018.01)

(52) U.S. Cl.
CPC ............... *H04W 4/44* (2018.02); *H04W 4/70* (2018.02)

(58) Field of Classification Search
CPC ........... H04W 4/44; H04W 4/38; H04W 4/70; H04W 4/80; H04W 84/18; H04W 28/021; H04W 28/0215; H04W 88/02
See application file for complete search history.

(56) References Cited

U.S. PATENT DOCUMENTS

| | | | |
|---|---|---|---|
| 2008/0143833 A1* | 6/2008 | Yanai | B60R 1/00 348/148 |
| 2010/0134325 A1* | 6/2010 | Gomi | G03B 37/04 340/995.14 |
| 2016/0027401 A1* | 1/2016 | Umehara | G09G 5/006 345/633 |
| 2016/0378112 A1* | 12/2016 | Ljubuncic | G06K 9/00845 701/45 |
| 2017/0132477 A1* | 5/2017 | Kim | H04W 12/069 |
| 2018/0059416 A1* | 3/2018 | Bhalla | G06K 9/325 |
| 2019/0051150 A1* | 2/2019 | Anderson | G08G 1/005 |

FOREIGN PATENT DOCUMENTS

JP        2008-263580 A    10/2008
WO    WO-2017196397 A1 *  11/2017  ........ H04W 72/0406

* cited by examiner

*Primary Examiner* — Mohamed A Kamara
(74) *Attorney, Agent, or Firm* — Maschoff Brennan

(57) ABSTRACT

A vehicle communication device for use in a vehicle includes a data acquisition unit for acquiring captured images as travel data; a data generator for generating transmission data from the travel data for transmission to a data center; and a data transmitter transmitting the transmission data generated by the data generator to the data center. When there is a plurality of different travel data types, the data generator can increase the priority of any of the travel data types based on a data center necessity level, and prioritize the transmission of the transmission data generated from prioritized travel data.

16 Claims, 8 Drawing Sheets

FIG. 4

| TRAVEL DATA TYPE | TRANS COND | VEHICLE SITUATION | | | | | | |
|---|---|---|---|---|---|---|---|---|
| | | STRAIGHT | R-TRN | L-TRN | REVS | BOARD STOP | OCCU ABN | ERR |
| F-CAM IMAGE | RES | 4K | 4K | 4K | Full-HD | HD | – | |
| | FRM RATE | 20fps | 20fps | 20fps | 10fps | 5fps | – | |
| | PRIORITY | 1 | 2 | 2 | 2 | 3 | – | |
| R-CAM IMAGE | RES | Full-HD | 4K | Full-HD | HD | HD | – | |
| | FRM RATE | 20fps | 20fps | 10fps | 5fps | 5fps | – | |
| | PRIORITY | 2 | 1 | 3 | 3 | 5 | – | |
| L-CAM IMAGE | RES | Full-HD | Full-HD | 4K | HD | 4K | – | |
| | FRM RATE | 20fps | 10fps | 20fps | 5fps | 20fps | – | |
| | PRIORITY | 2 | 3 | 1 | 3 | 1 | – | |
| BK-CAM IMAGE | RES | Full-HD | Full-HD | Full-HD | 4K | HD | – | |
| | FRM RATE | 10fps | 10fps | 10fps | 20fps | 5fps | – | |
| | PRIORITY | 3 | 4 | 4 | 1 | 4 | – | |
| CAB-CAM IMAGE | RES | HD | HD | HD | HD | Full-HD | 4K | |
| | FRM RATE | 5fps | 5fps | 5fps | 5fps | 10fps | 10fps | |
| | PRIORITY | 4 | 5 | 5 | 4 | 2 | 1 | |

| | VEHICLE SITUATION | | | | | |
|---|---|---|---|---|---|---|
| | STRAIGHT | R-TURN | L-TURN | REVERSE | BOARD STOP | OCCU ABN |
| PRIORITY | 2 | 2 | 2 | 2 | 2 | 1 |

DEVICE, METHOD, AND COMPUTER PROGRAM PRODUCT FOR VEHICLE COMMUNICATION

CROSS REFERENCE TO RELATED APPLICATION

The present application is based on and claims the benefit of priority of Japanese Patent Application No. 2018-120953, filed on Jun. 26, 2018, the disclosure of which is incorporated herein by reference.

TECHNICAL FIELD

The present disclosure relates to a device, a method, and a computer program product for vehicle communication.

BACKGROUND INFORMATION

A vehicle such as a car or bus may use a vehicle communication device to transmit vehicle information (i.e., data) to an external data/control center. When a vehicle situation changes, problems may arise in sending the data from the vehicle to the data center. As such, devices, methods, and computer program products for vehicle communication are subject to improvement.

SUMMARY

The present disclosure describes a vehicle communication device, a vehicle communication method, and a vehicle communication computer program product that enables a vehicle communication device to prioritize the transmission of data to an external data center based on a vehicle situation.

BRIEF DESCRIPTION OF THE DRAWINGS

Objects, features, and advantages of the present disclosure will become more apparent from the following detailed description made with reference to the accompanying drawings, in which:

FIG. 4 illustrates a table of conditional rules;

DETAILED DESCRIPTION

Figure 1:
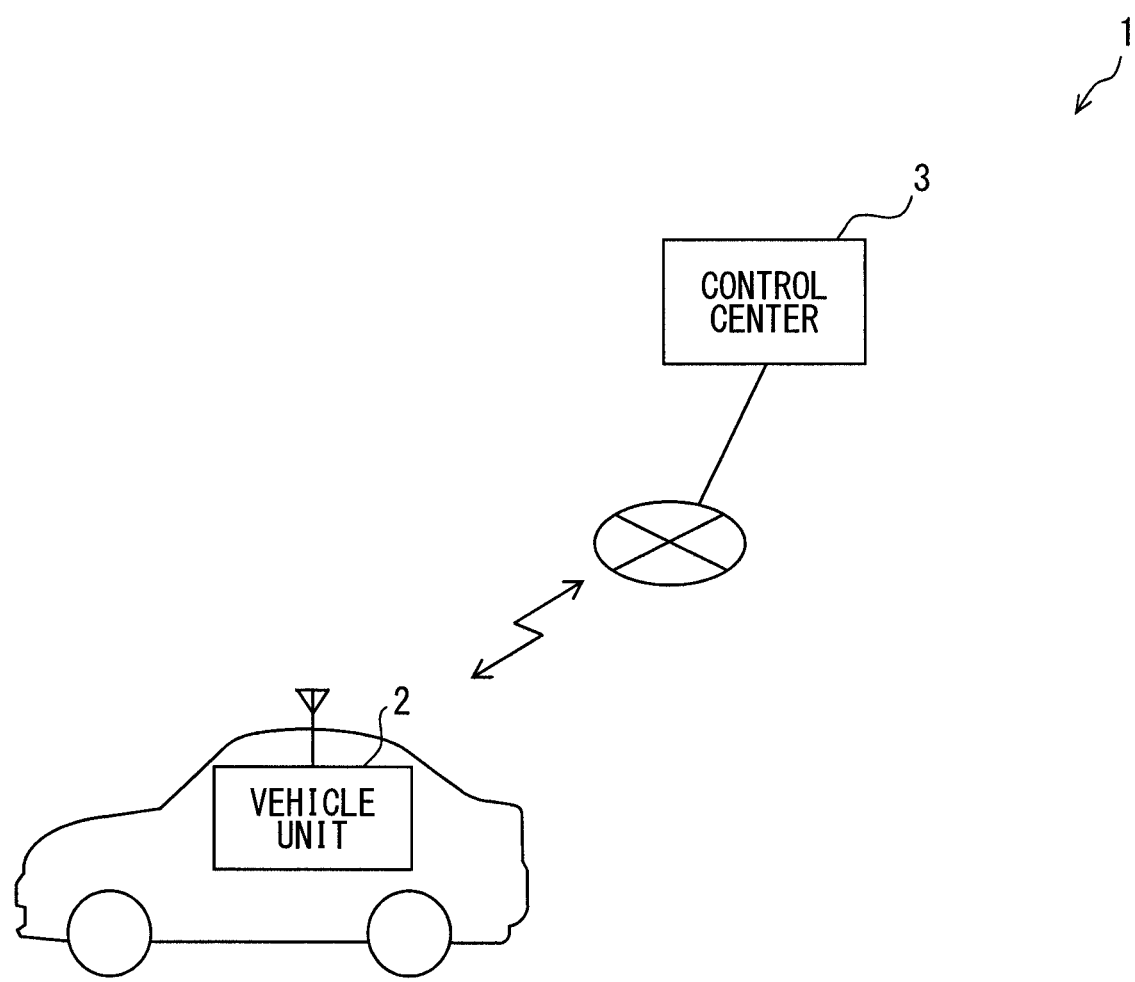
FIG. 1 illustrates a schematic configuration of a travel data collection system.

A vehicle such as a car or bus may use a vehicle communication device to transmit vehicle information to an external data/control center. For example, a vehicle may transmit vehicle data to a data collection center (i.e., data center) in the vehicle network such as traffic management center in an intelligent transportation system. Such a data center may be a communication node in the vehicle network and external to the vehicle, such as a brick and mortar data processing center, database, server, or like data collection location/device. The data center may use such data for traffic management.

When the subject vehicle is a driverless/self-driving/autonomous driving vehicle or has auto-drive capabilities, the vehicle data (i.e., vehicle travel data) may also be used by the data center to control the auto-driving function of the subject vehicle. That is, the data center may also be referred to as a control center when the data center is configured to control an auto-drive function of the subject vehicle.

The vehicle communication device may wirelessly transmit images captured by cameras in and around the car to the data center. The communication device may change the parameters of the data sent to the data collection center such as data type, resolution, and frame rate based on the state of wireless communications between the car and data collection center, where the communication state may refer to wireless signal strength, reception quality, transmission speed, and like wireless telecommunication parameters.

While vehicle communication systems may change the parameters of the data sent to the data center based on the communication state between the vehicle and the data center, such communication systems and vehicle communication devices may not account for changed circumstances or changes in a vehicle situation. As such, when the data center changes the priority of data received by the vehicle based on a changed vehicle situation, problems may arise in the vehicle communication device in changing the priority of the data transmitted to the data center.

The present disclosure describes a vehicle communication device, a vehicle communication method, and a vehicle communication computer program product that enables a vehicle communication device to prioritize the transmission of data to an external data center based on a vehicle situation.

The vehicle communication device, method, and computer program product described herein can prioritize the travel data based on the needs of the data center. That is, for example, when the data center is controlling the auto-drive function of the subject vehicle, a change in a driving situation of the subject vehicle may change the importance of the travel/image data sent to the control center and used to control the subject vehicle. The vehicle communication device, vehicle communication method, and vehicle communication computer program product may all increase the transmission priority of the travel image/data to the data center for the more important, pertinent, and relevant image/travel data corresponding to current driving situation of the subject vehicle, while lowering the transmission priority of other travel data that is less relevant or pertinent to the current driving situation of the subject vehicle. For example, when the driving situation of the subject vehicle changes from driving on a road to a vehicle situation where the subject vehicle drives into and parks in a parking lot, the vehicle communication device and its related method and computer program product can change the transmission priority of the image data captured by cameras on the subject vehicle so that the data/control center may use prioritized images of the surrounding parking lot to assist the subject vehicle in a self-driving parking operation. When the subject vehicle is driving straight on a road, images captured from the front camera on the subject vehicle may be most important for that driving situation, but the transmission priority for images captured from the front, side, and rear cameras may be prioritized when the subject vehicle changes to a parking situation to provide the data/control center with prioritized data of the more relevant/pertinent data for the control center to assist the subject vehicle with a self-driving parking operation.

The transmission data transmitted to the data/control center is generated from the travel data with a higher level of relevance for the control performed by the control center from among a plurality of different data types by switching the transmission priority of such travel data to a higher priority value based on the degree of relevance from the data/control center side, and based on a vehicle situation and/or vehicle state. As such, the transmission data is generated in a manner that prioritizes the travel data that is most relevant to the data/control center for performing an auto-drive control of the subject vehicle. The transmission data generated in the above-described manner is transmitted to the control center as a prioritized transmission of the most-relevant data for use by the control center and the priority of the travel data transmitted from the subject vehicle to the control center can be changed as the vehicle situation changes.

Embodiments of the devices, methods, and computer program products for vehicle communication are described with reference to the drawings. In the following embodiments, like features and elements among the embodiments may be referred to by the same reference numerals, and a repeat description of previously described like features and elements may be omitted from the descriptions of the latter embodiments.

First Embodiment

<Schematic Configuration of the Travel Data Collection System>

With reference to FIG. 1, a travel data collection system 1 includes a vehicle unit 2 used in a vehicle and an external control center 3.

The vehicle may be a ground vehicle, for example, a private vehicle such as a personal automobile, or a commercial vehicle such as a bus or taxi.

The vehicle unit 2 is for use in a vehicle and configured to transmit travel data to the external control center 3 via a communication terminal 20. The travel data is data acquired by the vehicle in the course of vehicle operation (i.e., in the course of the vehicle driving/travelling). The travel data may include, for example, an image captured by an image capture device (e.g., camera) used by the vehicle.

The description of the present embodiment assumes an example situation where the vehicle unit 2 is used in a self-driving vehicle. The self-driving vehicle, also referred to as an autonomous vehicle, driverless vehicle, or auto-drive vehicle is a vehicle where the acceleration, braking, and steering are automatically controlled without any operational input by a vehicle operator/driver.

The control center 3 may be, for example, a server device connected to a public communication network. The control center 3 receives the travel data transmitted from the communication terminal 20 of the vehicle unit 2. As the control center 3 receives travel data from vehicles, the control center 3 may also be referred to as the data center 3. Based on the travel data transmitted from the communication terminal 20, the control center 3 can perform vehicle control functions for controlling and/or assisting the autonomous drive (i.e., auto-drive) of the vehicle. The control center 3 may include one server device or a plurality of server devices. The control center 3 may be configured to receive travel data from a plurality of vehicles having the vehicle units 2, and to control the plurality of vehicles.

In the description, "subject vehicle" may be used to refer to the vehicle itself and "another vehicle" or "other vehicles" may be used to refer to vehicles other than the subject vehicle.

In the present embodiment, the control center 3 uses the travel data transmitted from the communication terminal 20 to control the vehicle. However, instead of using the travel data for vehicle control, the control center 3 may use the travel data, for example, for map construction and map updating by using a simultaneous localization and mapping (SLAM) service. In cases where the travel data is used for purposes other than vehicle control, a data center other than the control center 3 may also be used.

<Schematic Configuration of the Vehicle Unit>

Figure 2:
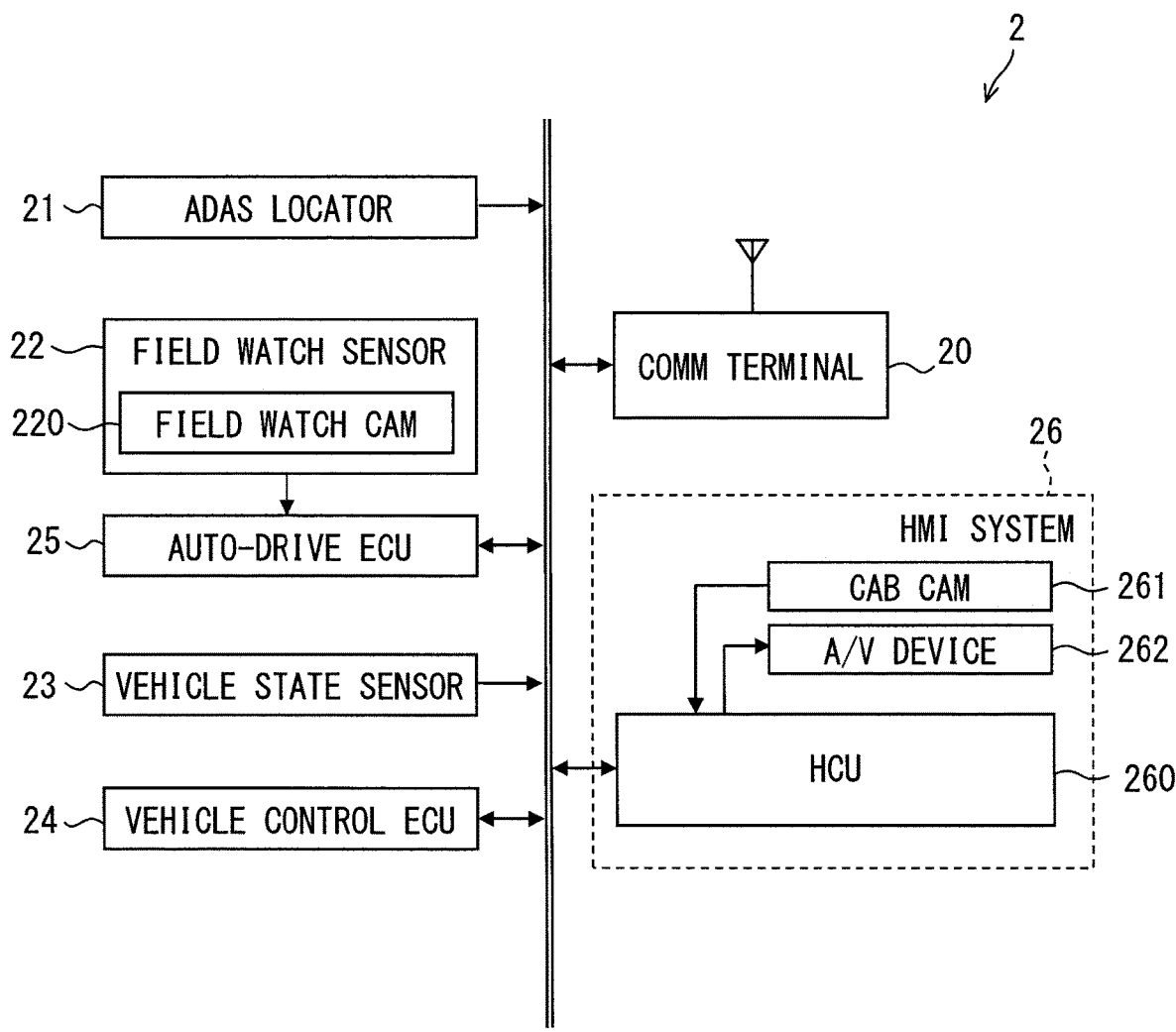
FIG. 2 illustrates a schematic configuration of a vehicle unit.

An example configuration of the vehicle unit 2 is described with reference to FIG. 2. The vehicle unit 2 includes the communication terminal 20, an advanced driver-assistance systems (ADAS) locator 21, a field watch sensor 22, a vehicle state sensor 23, a vehicle control electronic control unit (ECU) 24, an auto-drive ECU 25, and a human machine interface (HMI) system 26. The communication terminal 20, the ADAS locator 21, the vehicle state sensor 23, the vehicle control ECU 24, the auto-drive ECU 25, and the HMI system 26 may be connected to an in-vehicle local area network (LAN).

The ADAS locator 21 includes a global navigation satellite system (GNSS) receiver, an inertial sensor, and a map database (DB) storing map data. The GNSS receiver is configured to receive position signals from a plurality of navigation satellites. The inertial sensor includes, for example, a gyro sensor and an acceleration sensor. The map DB is a nonvolatile memory that stores map data. The map data may include: vector maps with roads represented as straight line links and intersections represented by single point nodes; road data related to the shape and size of the road; and graphical representations of the vector maps and road data for display on a graphical user interface (GUI) such as a vehicle navigation system. The graphical representation in the map data may include a three-dimensional map of point group data having three dimensional coordinates that include three-dimensional graphical representations of road shape, features of road-related structures, and points of interest.

The ADAS locator 21 continuously (i.e., sequentially) measures the position of a subject vehicle by combining the position signals from the GNSS receiver and the measurement results of the inertial sensor. Vehicle speed and distance data, as measured by vehicle sensors, may also be used to determine the position of the subject vehicle. The measured vehicle position is then output to the in-vehicle LAN. In instances where the map data includes a three-dimensional map that includes point group data of road shapes and feature points of road-related structure, the ADAS locator 21 may not use the GNSS receiver for vehicle positioning, but may use the map data and detection results of the field watch sensor 22 for vehicle positioning. The field watch sensor 22 may use light imaging detection and ranging (LIDAR) to generate a 3-D representation of an area around the vehicle. The ADAS locator 21 may compare the 3-D representation from the field watch sensor 22 to the point group data of the map data in the DB to determine the position of the vehicle. While the map data may be preloaded and stored in the DB of the ADAS locator 21 in the vehicle, the map data may also be acquired from sources outside the vehicle, for example, via the communication terminal 20 in the vehicle unit 2.

Figure 5:
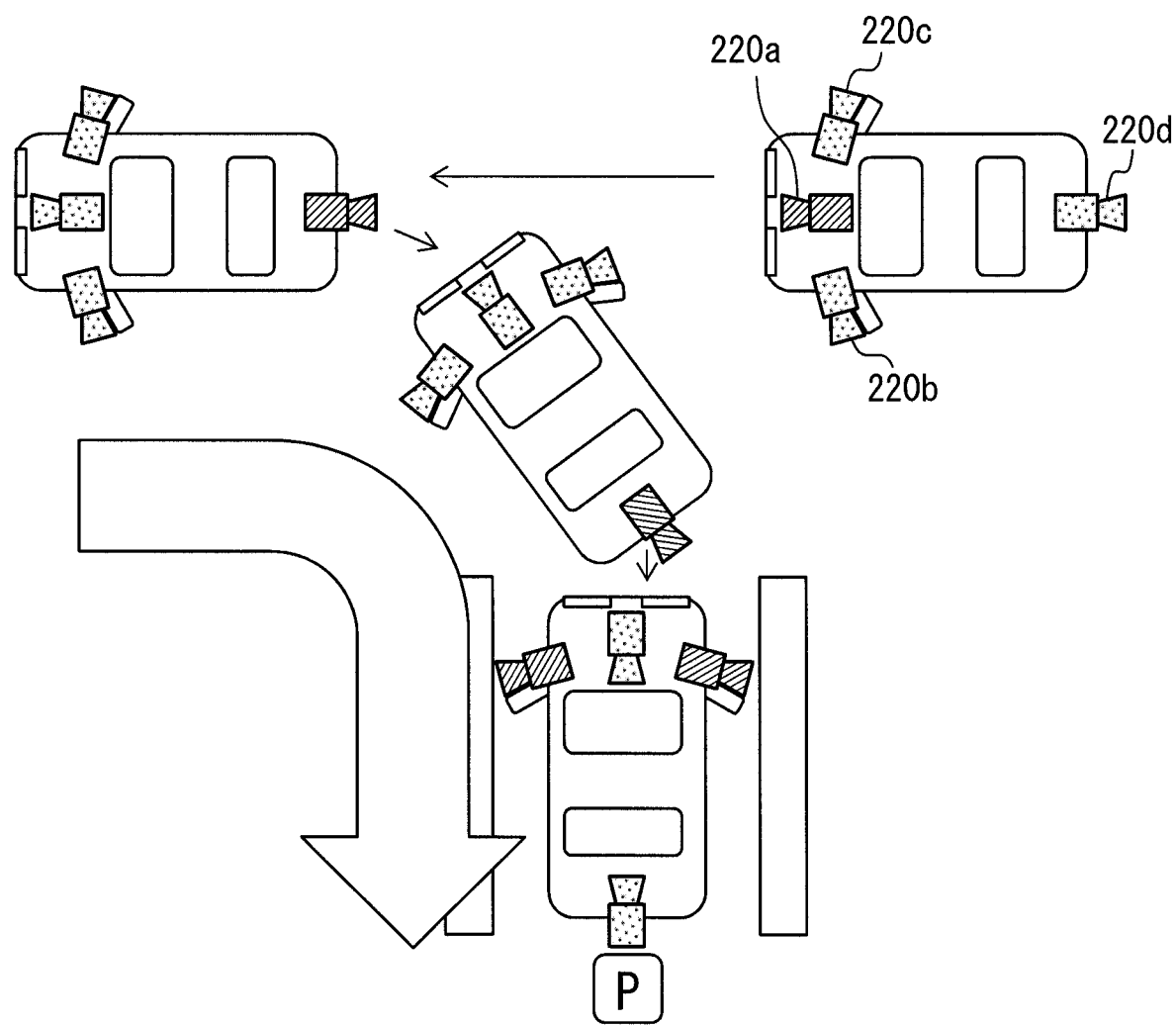
FIG. 5 illustrates a reverse parking example of an auto-drive vehicle where data transmission is changed.
Figure 9:
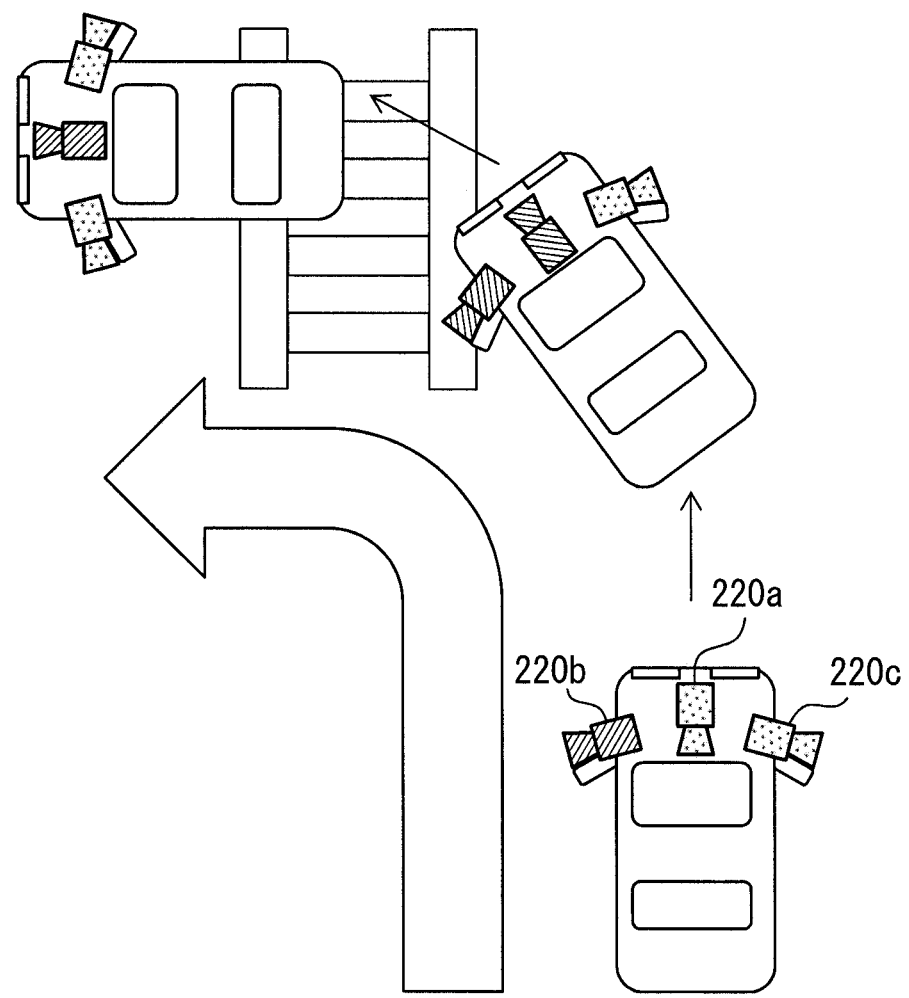
FIG. 9 illustrates a left turn example of an auto-drive vehicle.

The field watch sensor 22 is an autonomous sensor that monitors the surrounding environment of the subject vehicle. The field watch sensor 22 may detect obstacles around the subject vehicle such as pedestrians, moving objects like other vehicles, and stationary objects such as objects in and on the road and surrounding areas. The field watch sensor 22 can also detect road surface markings such as lane divider lines, edge lines, and parking lines. The field watch sensor 22 includes one or more field watch cameras 220 for imaging a predetermined range around the subject vehicle. The field watch camera 220 may include a plurality of different camera types in different imaging directions. For example, as shown in FIGS. 5 and 9, the field watch camera 220 may include a front camera 220a having a predetermined imaging range in front of the subject vehicle, a left-side camera 220b having a predetermined imaging range on the left side of the subject vehicle, a right-side camera 220c having a predetermined imaging range on the right side of the subject vehicle, and a backward camera 220d having a predetermined imaging range behind the subject vehicle. The field watch camera 220 outputs sequentially-captured images to the auto-drive ECU 25 as sensing information.

As the field watch sensor 22, a millimeter wave radar, a sonar, LIDAR or like imaging/ranging device for transmitting a reflective probe wave in a predetermined range around the subject vehicle may be used. The reflective probe wave may reflect off of surrounding objects and return to the field watch sensor 22 to generate sensing information. The field watch sensor 22 outputs the sensing information from the reflective probe wave to the auto-drive ECU 25. The sensing information detected by the field watch sensor 22 may be output to the in-vehicle LAN via the auto-drive ECU 25.

The vehicle state sensor 23 is a sensor group for detecting various states of the vehicle (i.e., vehicle states). The vehicle state sensor 23 may include a vehicle speed sensor for detecting a vehicle speed, a steering sensor for detecting a steering angle, a seat sensor for detecting a presence or absence of an vehicle occupant, an accelerator position sensor for detecting an opening degree of the accelerator pedal, a brake pedal force sensor for detecting the amount of pressure applied to the brake pedal, and a shift position sensor for detecting a shift position of the vehicle transmission. The vehicle state may also be acquired from a door switch for detecting the opening and closing of doors on the subject vehicle, a turn signal switch for detecting the operation of a turn signal on the subject vehicle, and a headlight switch for detecting the operation of the vehicle headlights. The vehicle state sensor 23 may also include a biometric sensor for detecting biometric information of the vehicle occupant. As the biometric sensor, a noninvasive pulse wave sensor or like sensor disposed in a seat of the vehicle may be used. The vehicle state sensor 23 outputs the detected sensing information to the in-vehicle LAN. The sensing information detected by the vehicle state sensor 23 may be output to the in-vehicle LAN via an ECU in the subject vehicle.

The vehicle control ECU 24 is an electronic control device that performs acceleration/deceleration control and/or steering control of the subject vehicle. The vehicle control ECU 24 includes a steering ECU that performs steering control, and a power unit control ECU and a brake ECU that perform acceleration/deceleration control. The vehicle control ECU 24 acquires detection signals output from sensors in the subject vehicle such as the accelerator position sensor, the brake pedal force sensor, the steering angle sensor, and the vehicle speed sensor. The vehicle control ECU 24 may use the acquired detection signals to output control signals to various systems and components in the vehicle. For example, the vehicle control ECU 24 may output a control signal to an electronic throttle control, a brake actuator, and an electric power steering (EPS) motor. The vehicle control ECU 24 can output the sensing information acquired from the vehicle sensors to the in-vehicle LAN.

The auto-drive ECU 25 performs an automatic driving function in place of a driving operation by the driver by controlling the vehicle control ECU 24. The auto-drive ECU 25 recognizes the environment of the subject vehicle by the vehicle position acquired from the ADAS locator 21 and the map data together with the detection result by the field watch sensor 22. For example, by using the detection result of the field watch sensor 22, the auto-drive ECU 25 can recognize the shape and movement state of an object around the subject vehicle, and recognize the road surface markings around the subject vehicle. The auto-drive ECU 25 can use the vehicle position, map data, and output from the field watch sensor 22 to generate/model a three dimensional (3-D) virtual space that reproduces the actual travel environment of the subject vehicle.

The auto-drive ECU 25 generates a drive plan to automatically drive the subject vehicle using an automatic self-driving function based on the recognized travel environment. The auto-drive ECU 25 may generate short, medium, and long term drive plans. The medium and long term drive plans define a route for directing the subject vehicle to a set destination. The short term drive plan defines a planned travel locus (i.e., route) for realizing the travel plans based on the medium and long term plans by using the generated virtual space around the subject vehicle. Specifically, steering parameters for lane keeping and changing lanes, speed adjustments for acceleration and deceleration, and braking parameters for collision avoidance are determined and executed by the auto-drive ECU 25 based on the short term drive plan.

The HMI system 26 includes a human machine interface control unit (HCU) 260, a passenger compartment (i.e., cabin) camera 261, and a presentation device 262. The HCU 260 includes one or more processors (e.g., CPUs), memory, input/output (I/O) devices/ports, and a bus that electrically connects the processor, memory, and I/O devices/ports. The HCU 260 executes various processes related to the functions performed by the HMI system 26 by executing a control program stored in the memory.

The cabin camera 261 captures an image of a predetermined range in the passenger compartment of the subject vehicle. As the cabin camera 261, a driver status monitor (DSM) for monitoring the driver of the vehicle may be used. The DSM includes a near infrared light source and a near infrared camera together with a control unit for controlling the light source and camera. The DSM detects, for example, a driver's face orientation, a degree of driver drowsiness or fatigue, and whether the driver is in a safe/unsafe state for operating the vehicle based on a captured image acquired by imaging the driver's face with the near-infrared camera. The presentation device 262 presents information in accordance with instructions by the HCU 260. For example, the presentation device 262 displays various images and outputs various sounds as notifications to present information to vehicle occupants. As such, the presentation device 262 may be an audio and/or visual device used to present audio and/or visual information to the occupants of the subject vehicle.

The communication terminal 20 includes a small computer such as a microcontroller or system on a chip (SoC) that includes one or more processors (e.g., CPUs), memory, I/O devices, and a bus connecting the processor, memory, and I/O devices. The memory is a non-transitory, tangible storage medium that stores computer readable programs, instruction sets, and data (i.e., computer program products). The non-transitory, tangible storage medium may be realized by, for example, a semiconductor memory and a magnetic disk. The communication terminal 20 may also include an antenna for wireless communication. The communication terminal 20 executes various kinds of processes by executing a computer control program product (i.e., control program) stored in the memory of the computer. The communication terminal 20 may also be referred to as a vehicle communication device 20. The execution of the control program by the processor may also be referred to as the execution of a vehicle communication method corresponding to the control program.

The communication terminal 20 is used by the vehicle to acquire the travel data generated in the course of driving the subject vehicle. The communication terminal 20 communicates with the control center 3 via the public communication network to transmit the acquired travel data to the communication terminal 20. The travel data may be information (e.g., sensor information) from a device other than the field watch camera 220 of the field watch sensor 22. For example, the travel data may be the sensor information from the vehicle state sensor 23. In the present embodiment, the images captured by the field watch camera 220 and the cabin camera 261 are examples of travel data.

<Schematic Configuration of the Communication Terminal>

Figure 3:
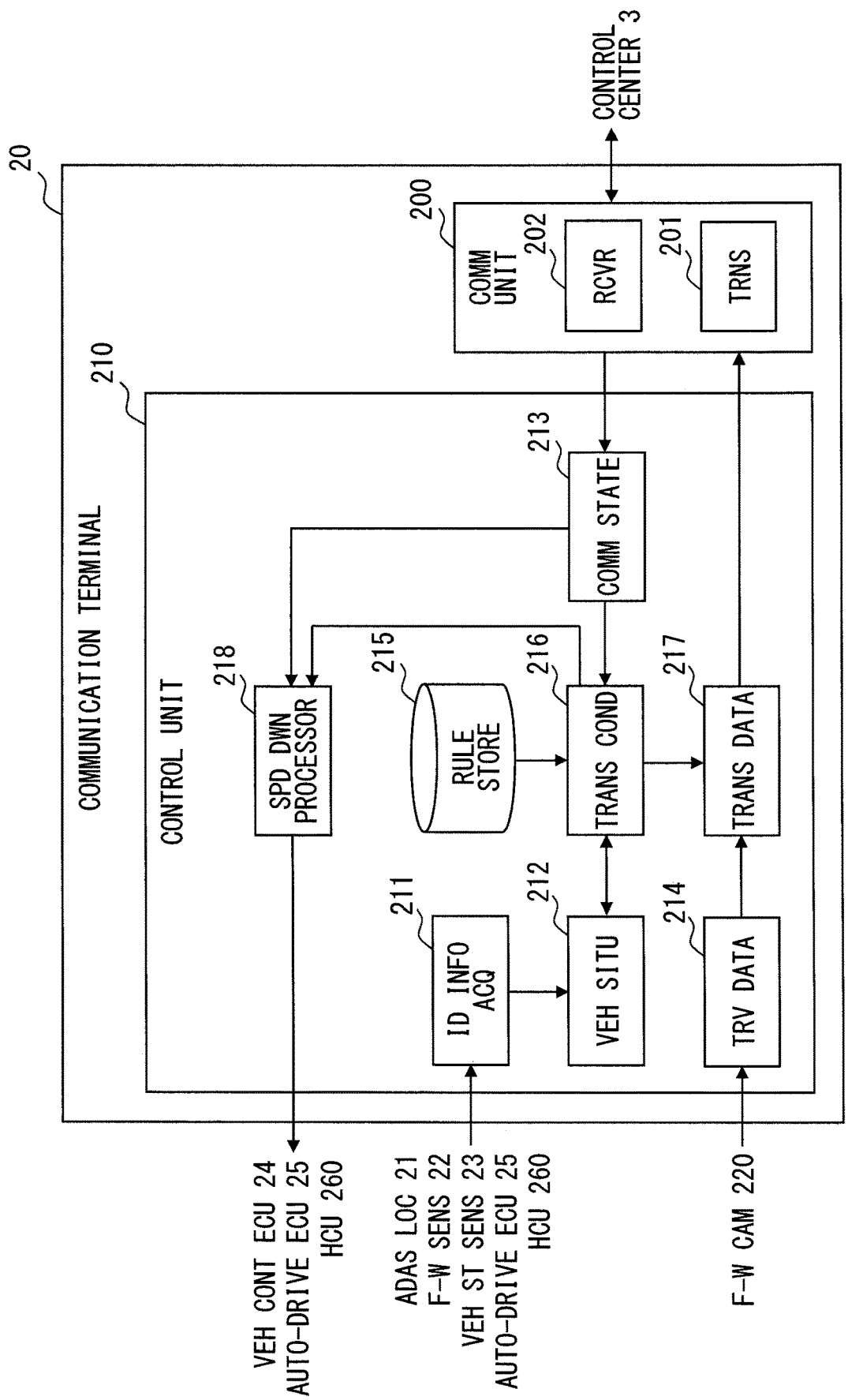
FIG. 3 illustrates a schematic configuration of a communication terminal.

A schematic configuration of the communication terminal 20 is described with reference to FIG. 3. As shown in FIG. 3, the communication terminal 20 includes a communication unit 200 and a control unit 210. The functions performed by the communication terminal 20 and associated with the communication unit 200 and the control unit 210 may be realized by the execution of software, by hardware, or by a combination of hardware and software. For example, as described above, the communication terminal 20 includes a computer that may execute a program or instruction set stored in memory that can realize the functions and processes associated with the communication terminal 20, the communication unit 200 and the control unit 210. Additionally or alternatively, part or all of the functions executed by the communication terminal 20, the communication unit 200, and the control unit 210 may be configured as hardware, for example, as circuits configured to perform the functions/processes associated with the communication terminal 20, the communication unit 200, and the control unit 210. Such circuits may include analog circuit components, digital circuit components, logical circuit components, and a combination of circuit components configured to perform the processes/functions associated with the communication terminal 20, the communication unit 200, and the control unit 210. The communication unit 200 and the control unit 210 and the components of the communication unit 200 and the control unit 210 may also be realized as specialized circuits for performing the processes respectively associated with the communication unit 200, the control unit 210, and their components parts. For example, the communication unit 200 and the control unit 210 may be realized by a specialized circuit such as an application-specific integrated circuit (ASIC) or a field-programmable gate array (FPGA). Part or all of the various functions associated with the communication unit 200 and the control unit 210 may be implemented by the combination of software (e.g., a computer program product) executed by the processor in the communication terminal 20 and hardware components.

The communication unit 200 has an antenna for wireless communication and may perform mobile communication with a base station. For example, the communication unit 200 may transmit and receive information by wireless communication via an access point of the wireless LAN to communicate with the control center 3. As shown in FIG. 3, the communication unit 200 includes a transmission unit 201 and a reception unit 202. The transmission unit 201 wirelessly transmits the data generated by the control unit 210 to the control center 3. The transmission unit 201 may also be referred to as a data transmitter 201. The reception unit 202 receives information transmitted from the control center 3. For example, the control center 3 may transmit a control instruction to the reception unit 202 for automatically controlling the drive of the subject vehicle using the communication terminal 20 and/or may transmit a request for control permission to the reception unit 202.

As shown in FIG. 3, the control unit 210 includes an identification information acquisition unit 211, a vehicle situation identification unit 212, a communication state determination unit 213, a travel data acquisition unit 214, a rule storage unit 215, a transmission condition determination unit 216, a transmission data conversion unit 217, and a speed down processor 218.

The identification information acquisition unit 211 acquires information for identifying a vehicle situation of the subject vehicle (i.e., "vehicle situation identifying information"). For example, the identification information acquisition unit 211 acquires vehicle state information as the vehicle situation identifying information. Vehicle state information may include, for example: a vehicle speed detected by the vehicle speed sensor, a steering angle detected by the steering angle sensor, a shift position detected by the shift position sensor, the number of occupants detected by the seating sensor, biometric information of the occupant(s) detected by the biometric sensor, door opening and closing detected by the door courtesy switch, turn signal operations detected from the turn signal switch, and turning ON and OFF the headlights detected by the light switch. The identification information acquisition unit 211 may also acquire information from the ADAS locator 21 such as accelerations detected by an inertia sensor or like sensors.

The identification information acquisition unit 211 may acquire sensor information from the field watch sensor 22 and travel environment information based on the sensor information from the auto-drive ECU 25 as the vehicle state information. The identification information acquisition unit 211 may acquire the driver monitoring results by the DSM via the HCU 260. When the HMI system 26 includes a sound collecting microphone that collects sounds in the passenger compartment, the sound data may be acquired via the HCU 260.

In addition to the above-described information acquired by the identification information acquisition unit 211, the identification information acquisition unit 211 can also acquire route information as the vehicle situation identifying information. Examples of the route information include a vehicle position acquired from the ADAS locator 21, the speed limit of a current road, boarding positions on the road such as bus stops, an intersection position, and a parking lot position.

The identification information acquisition unit 211 may also acquire the drive plan generated by the auto-drive ECU 25 as the route information.

The vehicle situation identification unit 212 identifies a vehicle situation of the subject vehicle based on the vehicle situation identifying information acquired by the identification information acquisition unit 211. For example, the vehicle situation identification unit 212 may identify the vehicle situation of the subject vehicle as "straight," "right turn," "left turn," "reverse," "boarding stop," and "occupant abnormality."

"Straight" is a situation in which the vehicle is traveling straight ahead in a forward direction. When the vehicle speed is substantially greater than 0 km/h, the shift position is in the "Drive" (D) range, and the steering angle is within a predetermined range, the vehicle situation identification unit 212 sets the vehicle situation of the subject vehicle to "Straight." Substantially greater than 0 km/h may be a detection limit value of the vehicle speed by the vehicle speed sensor, which may mean that a vehicle speed of greater than 5 km/h is substantially greater than 0 km/h. The predetermined range with regard to the steering angle is a range that distinguishes right and left turn from straight travel, and may be a range extending over positive and negative angles and centered on 0 degrees, which is the neutral position of the steering system (e.g., steering wheel). In the present embodiment, the steering angle becomes a positive value when steering to the right of the neutral position (e.g., rotating/turning the steering wheel to the right of the neutral position) and a negative value when steering to the left of the neutral position.

Right turn" is a situation where the vehicle is turning right at an intersection. When the vehicle speed is substantially greater than 0 km/h, the shift position is in the "Drive" (D) range, the steering angle is greater than the predetermined range, and the vehicle position is at an intersection position, the vehicle situation of the subject vehicle may be identified as "right turn." On the other hand, "left turn" is a situation where the vehicle is turning left at an intersection. When the vehicle speed is substantially greater than 0 km/h, the shift position is in the D range, the steering angle is smaller than the predetermined range, and the vehicle position is at the intersection position, the vehicle situation of the subject vehicle may be identified as "left turn."

"Reverse" is a situation in which the subject vehicle is moving backward. When the speed sensor senses that the vehicle speed is substantially greater than 0 km/h and the shift position is in the "Reverse" (R) range, the vehicle situation identification unit 212 may identify the vehicle situation of the subject vehicle as "reverse."

"Boarding stop" is a situation in which the subject vehicle is stopped to let passengers on and off (i.e., stopped to let passengers enter and exit the vehicle). When the vehicle speed is substantially equal to or less than 0 km/h, the shift position is in the "Parking" (P) range, and the vehicle position identified by the ADAS locator 21 corresponds to a boarding position (i.e., a boarding location), the vehicle situation identification unit 212 may identify the vehicle situation of the subject vehicle as "boarding stop." The boarding position may be identified from the route information acquired by the identification information acquisition unit 211. The boarding position may be a parking lot position, or may be a bus stop if the subject vehicle is a bus.

"Occupant abnormality" is a situation in which there is a problem, issue, and/or impairment (i.e., abnormality) with a passenger or occupant of the subject vehicle. When the DSM detects that a driver of the subject vehicle has fallen asleep, the DSM determines the inoperability of the driver and the biometric information of the occupant detected by the biometric sensor shows an abnormality of the occupant, the vehicle situation identification unit 212 may identify the vehicle situation of the subject vehicle as "occupant abnormality." The sound collecting microphone may also be used for determining abnormalities with the occupant by taking sound samples from the passenger compartment and comparing the sound data to a threshold value. If the sound data is equal to a greater than a threshold value, the vehicle situation of the subject vehicle may be identified as "occupant abnormality."

"Detection error" is a situation in which the vehicle situation cannot be identified by the vehicle situation identification unit 212.

The communication state determination unit 213 determines a communication state of the subject vehicle with the control center 3. The communication speed and the delay time may be used as the communication state. In the present embodiment, both the communication speed and the delay time are used as examples for the communication state. The communication speed, for example, is an amount of data that can be transferred per second by upload (i.e., uplink communication) and download (i.e., downlink communication). The delay time, for example, is the amount of communication delay in the upload and download of data. The communication state determination unit 213 may be configured to use a measurement value of the latest communication speed and delay time in the communication unit 200 as a communication state, or may be configured to use past statistical values of the communication speed and delay time in the communication unit 200 as a communication state. The statistical values may be an average value, a median value, or a mode value.

The travel data acquisition unit 214 acquires travel data in the course of vehicle travel (i.e., while the vehicle is driving/traveling). The travel data acquisition unit 214 may also be referred to simply as a data acquisition unit 214. In the present embodiment, the data acquisition unit 214 can acquire the images captured by the field watch camera 220 and the cabin camera 261. More specifically, the data acquisition unit 214 acquires images captured from different directions such as those captured by the front camera 220a, the left side camera 220b, the right side camera 220c, the backward camera 220d, and the cabin camera 261. That is, the data acquisition unit 214 may acquire a plurality of different travel data types. The image captured by the front camera 220a may be referred to as a "front camera image," the image captured by the left side camera 220b may be referred to as a "left camera image," the image captured by the right side camera 220c may be referred to as a "right camera image," the image captured by the backward camera 220d may be referred to as a "backward camera image," and the image captured by the cabin camera 261 may be referred to as a "cabin camera image."

The rule storage unit 215 stores information for determining the transmission conditions for transmitting data. More specifically, the rule storage unit 215 stores corresponding relationships between the vehicle situations and the transmission conditions of the travel data by data type. The corresponding relationships between the vehicle situations and transmission conditions may also be referred to as condition rules. The control unit 210 may prioritize the transmission of data and change the priority of the data based on the type of vehicle situation, where such prioritization may be referred to as priority rules. Example condition rules are described with reference to FIG. 4, and example priority rules are described with reference to FIG. 6.

As shown in FIG. 4, for the condition rules, the vehicle situations such as "straight," "right turn," "left turn," "reverse," "boarding stop," "occupant abnormality," and "detection error" are associated with the transmission conditions such as resolution, frame rate, and priority for each type of travel data such as "the front camera image," the "left camera image," the "right camera image," the "backward camera image," and the "cabin camera image." The priority indicates a transmission order priority of the travel data. Both the frame rate and the resolution are attributes of the travel data (i.e., travel data attributes). In this example, five stages of priority are set from high to low as values "1" to "5" where the lowest value (i.e., 1) indicates the highest transmission order priority. For example, data having a priority of "1" has the highest transmission priority while data with a priority of "5" has the lowest transmission priority. The resolution has three stages ranging from the highest resolution to the lowest resolution, where the resolution stages "4K," "Full HD," and "HD" are arranged in order from the highest resolution to lowest. The frame rate has three stages ranging from the highest rate to the lowest rate, where the frame rates of "20 fps," "10 fps," and "5 fps" are arranged in order from the highest rate to the lowest.

In the example described with reference to FIG. 4, for a "straight" vehicle situation, the "front camera image" travel data has a priority of "1," a resolution of "4K," and a frame rate of "20 fps." The "right camera image" and "left camera image" travel data for a "straight" vehicle situation have a priority of "2," a resolution of "Full-HD," and a frame rate of "20 fps." The "backward camera image" for a "straight" vehicle situation has a priority of "3," a resolution of "Full HD," and a frame rate of "10 fps." The "cabin camera image" for a "straight" vehicle situation has a priority of "4," a resolution of "HD," and a frame rate of "5 fps."

For a "right turn" vehicle situation: the "right camera image" has a priority of "1," a resolution of "4K," and a frame rate of "20 fps;" the "front camera image" has a priority of "2," a resolution of "4K," and a frame rate of "20 fps;" the "left camera image" has a priority of "3," a resolution of "Full HD," and a frame rate of "10 fps;" the "backward camera image" has a priority of "4," a resolution of "Full-HD," and a frame rate of "10 fps;" and the "cabin camera image" has a priority of "5," a resolution of "HD," and a frame rate of "5 fps."

For a "left turn" vehicle situation: the "left camera image" has a priority of "1," a resolution of "4K," and a frame rate of "20 fps;" the "front camera image" has a priority of "2," a resolution of "4K," and a frame rate of "20 fps;" the "right camera image" has a priority of "3," a resolution of "Full HD," and a frame rate of "10 fps;" the "backward camera image" has a priority of "4," a resolution of "Full HD," and a frame rate of "10 fps;" and the "cabin camera image" has a priority of "5," a resolution of "HD," and a frame rate of "5 fps."

For a "reverse" vehicle situation: the "backward camera image" has a priority of "1," a resolution of "4 K," and a frame rate of "20 fps;" the "front camera image" has a priority of "2," a resolution of "Full-HD," and a frame rate of "10 fps;" the "right camera image" and "left camera image" both have a priority of "3," a resolution of "HD," and a frame rate of "5 fps;" and the "cabin camera image" has a priority of "4," a resolution of "HD," and a frame rate of "5 fps."

For a "boarding stop" vehicle situation: the "left camera image" has a priority of "1," a resolution of "4K," and a frame rate of "20 fps;" the "cabin camera image" has a priority of "2," a resolution of "Full-HD," and a frame rate of "10 fps;" the "front camera image" has a priority of "3," a resolution of "HD," and a frame rate of "5 fps;" the "backward camera image" has a priority of "4," a resolution of "HD," and a frame rate of "5 fps;" and the "right camera image" has a priority of "5," a resolution of "HD," and a frame rate of "5 fps."

The above-described examples assume a commercial passenger vehicle providing transportation for passengers that operates in left-hand traffic where the subject vehicle is traveling on the left side of the road, such as in Japan, Australia, and Great Britain. For example, for busses driving in left-hand traffic countries, the bus door for passenger boarding may be on the left side of the bus, which is why the "left camera image" has such a high priority in the above example for a "boarding stop" vehicle situation. However, application of the present disclosure is not necessarily limited to a left-handed drive vehicle. That is, when the subject vehicle is traveling in a right-hand traffic country (e.g., United States, Canada, Germany), the above-given values for the transmission condition for transmitting the "left camera image" and the "right camera image" may be switched accordingly. When the subject vehicle is a private vehicle used for personal travel, the transmission conditions for both the "left camera image" and the "right camera image" may have a priority of "1," a resolution of "4K," and a frame rate of "20 fps."

For an "occupant abnormality" vehicle situation, the "cabin camera image" has a priority of "1," a resolution of "4K," and a frame rate "10 fps."

For a "detection error" vehicle situation, there is no associated travel data. In other words, the transmission conditions for the associated travel data are given as "none."

As described above, based on the condition rules, the transmission conditions that are associated with travel data of a higher importance or higher relevance have higher priorities, higher image resolutions, and higher frame rates than other types of travel data. The more important or more relevant travel data having a higher priority and higher quality may be used, for example, for collision avoidance. That is, the transmission condition for sending travel data with a higher importance/relevance to the control center 3 is set to have a high priority with a high image quality.

The relevance and importance of the travel data transmitted to the control center 3 may be used to determine the data center necessity level of the travel data to be transmitted, based on the auto-drive control of the subject vehicle to be performed by the control center 3 and the vehicle situation. The data center necessity level is related to the priority of the data to be transmitted to the control center 3. For example, when the control center 3 is controlling the subject vehicle to auto-drive in a reverse direction, "backward camera image" travel data captured from the backward camera 220*b* providing the control center 3 with backward image data from the subject vehicle may be more important/relevant for control center 3 to control the auto-drive reverse driving of the subject vehicle. As such, the data center necessity level for backward image data may be much higher than the "forward camera image" travel data during a reverse vehicle situation, and the control unit 210 accordingly raises the transmission priority level of the "backward camera image" travel data and lowers the transmission priority level of the "forward camera image" travel data. The control unit 210 may also determine the data center necessity level for the travel data in other ways, for example, from the condition rules, priority rules, and the transmission conditions. Though the data center necessity level may be determined on the control center 3 side, such data center necessity levels for data to be transmitted to the control center 3 and based on vehicle situations may be stored on the control center 3 side, or on the vehicle unit 2 side, for example, in the rule storage 215.

An example driving situation where the subject vehicle is backed in to a parking space that applies the condition rules in FIG. 4 is described with reference to FIG. 5. The example in FIG. 5 illustrates how travel data is switched for a driving situation where the auto-drive subject vehicle is reversed into a parking spot. Since FIG. 5 focuses on a reverse vehicle situation where the cabin camera 261 has the lowest priority of all the camera images, the cabin camera 261 is omitted from FIG. 5 for ease of description and understanding. FIG. 5 shows the subject vehicle with the front camera 220a, the left side camera 220b, the right side camera 220c, and the backward camera 220d.

In the reverse parking situation, in order for the control center 3 to determine whether the subject vehicle can automatically perform the reverse parking function (i.e., perform a reverse function using auto-drive), the captured images of the field watch camera 220 and the room camera 261 are transmitted from the vehicle unit 2 to the control center 3. For example, the control center 3 may make such determinations when the auto-drive ECU 25 is falsely or incorrectly identifying an obstacle in or around the designated parking lot as a pedestrian, where such an incorrect identification may interrupt and/or stop the auto-drive ECU 25 from performing the auto-drive reverse parking. As such, the control center 3 may be used to control the auto-drive function of the subject vehicle and the control center 3 may use image data (i.e., travel data) from the subject vehicle for the auto-drive control of the subject vehicle. As vehicle situations for the subject vehicle change during the auto-drive parking operation, the different image data captured by the plurality of image capture devices (i.e., cameras) on the subject vehicle may become more relevant/important or less relevant/important to the control center 3 for performing the auto-drive parking operation. That is, the transmission priority of such data may change based on the change in vehicle situations. As such, the vehicle unit 2 can change the priority of the travel data transmitted to the control center 3 depending on the vehicle situation.

As shown in FIG. 5, as an example of the reverse parking situation, the subject vehicle first drives straight past the open parking spot by driving in a travel direction substantially perpendicular to the parking lines. The subject vehicle then stops and shifts to reverse to back into the open parking spot.

When the subject vehicle first starts the reverse parking operation the subject vehicle travels straight ahead to an initial or start position for backing into a parking space. During the forward drive of the subject vehicle it is important for the subject vehicle to avoid contact with any obstacles/objects in front of the subject vehicle. As such, the control unit 210 may set the travel data for the "front camera image" captured by the front camera 220a to have a high priority and high image quality to prioritize the transmission of such data to the control center 3. In this situation, images captured by the forward camera 220a and transmitted to the control center 3 may be more important and relevant to the control center 3 for controlling the subject vehicle with a forward auto-drive to the initial position for backing into the parking space.

Then, the subject vehicle shifts to reverse to back into the parking space. Since it is important to avoid contact with objects and obstacles behind the subject vehicle when the subject vehicle begins to reverse from the start position of the reverse parking operation until the completion of the reverse parking operation, the control unit 210 may set the travel data for the "backward camera image" captured by the backward camera 220d to have a high priority and high image quality to prioritize the transmission of such data to the control center 3. In this situation, images captured by the backward camera 220d and transmitted to the control center 3 may be more important and relevant to the control center 3 for controlling the subject vehicle to back into the parking space.

When the auto-drive parking operation of the subject vehicle is complete, it is important to confirm that the boarding environment around the subject vehicle is safe for passengers that are boarding and exiting the subject vehicle. As such, the control unit 210 may set the data for the "left camera image" captured by the left side camera 220b and the "right camera image" captured by the right side camera 220c to have a high priority and high image quality to prioritize the transmission of such data to the control center 3. In this situation, images captured by the left and right side cameras 220c and 220d and transmitted to the control center 3 may be more important and relevant to the control center 3 for controlling the subject vehicle to allow passengers to enter and exit the subject vehicle.

In such manner, the example driving situation where the subject vehicle backs into a parking spot describes how the priority of data sent to the control center 3 can be switched depending on the circumstances of the driving situation. In other words, the transmission priority of data acquired by the subject vehicle may be changed (i.e., switched) during a driving operation. More specifically, the priority of the data may be switched depending on the importance and relevance of the data used by the control center 3 for an auto-drive control of the subject vehicle based on the driving situation.

As another example, the vehicle unit 2 can be used with a bus to automatically control or drive the bus as an auto-drive bus. In order to make it possible to check the operation status of the auto-drive bus by the control center 3, the images captured by the field watch camera 220 and the cabin camera 261 on the bus are transmitted from the vehicle unit 2 to the control center 3.

When the vehicle situation of the auto-drive bus is "straight," avoiding obstacles and objects in front of the auto-drive bus is important. As such, the control unit 210 may set the travel data for the "front camera image" to have a high priority and high image quality to prioritize the transmission of such image data to the control center 3 based on the data center necessity level for such travel data at the control center 3, as such data may be more important and relevant to the auto-drive control of the subject vehicle performed by the control center 3. On the other hand, when the vehicle situation changes to "boarding stop" the control center 3 may determine whether the environment around the bus stop is safe and ideal for opening the bus door to allow passengers on or off the bus. In other words, the control center 3 may make a door open determination. For example, there may be situations where the auto-drive ECU 25 cannot determine whether the boarding area at a bus stop is flooded, if the pavement is damaged making it unsafe for passengers to get on and off the bus, or if there is a stationary object or other vehicle stopped at the bus stop, all of which may cause the bus to stop at a location other than the bus stop to let passengers on and off the bus. In such cases, the control center 3 may be used to make the door open determination and the image data from the left and right side cameras 220c and 220d may be more relevant and important to the control center 3 for making the door open determination.

When the vehicle situation is "occupant abnormality," the priority and quality of the data for the "cabin camera image" are set to high to prioritize the transmission of such data to the control center 3 so that the control center 3 can assess any driver/passenger issues within the interior of the bus.

Figures 6, 7:
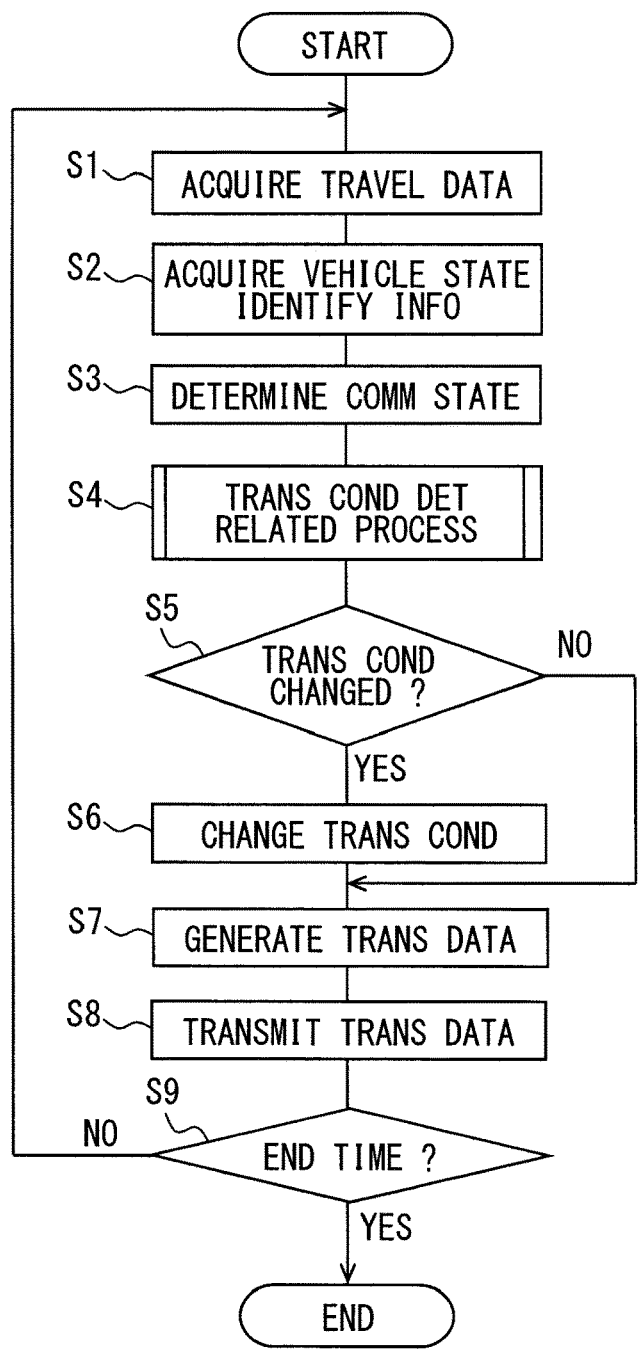
FIG. 6 illustrates a priority rule table.
FIG. 7 is a flowchart of a travel data transmission process.

The priority rules for vehicle situations are shown in FIG. 6. As shown in FIG. 6, the vehicle situations "straight," "right turn," "left turn," "reverse," "boarding stop," and "occupant abnormality" are associated with a priority.

In other words, when the vehicle situation identification unit 212 identifies a plurality of vehicle situation types at the same time, the vehicle situation identification unit 212 associates a priority indicating which of the vehicle situations is prioritized with the respective vehicle situations.

In the example shown in FIG. 6, the vehicle situations "straight," "right turn," "left turn," "reverse," and "boarding stop" each have a priority of "2" and the "occupant abnormality" vehicle situation has a priority of "1." That is, the priority of the vehicle situations "straight," "right turn," "left turn," "reverse," and "boarding stop" is lower than the vehicle situation "occupant abnormality."

The vehicle situations "straight," "right turn," "left turn," "reverse" and "boarding stop" have the same level of priority, because the vehicle situations "straight," "right turn," "left turn," "reverse," and "boarding stop" cannot occur at the same time.

The condition rules and the priority rules stored in the rule storage unit 215 can be renewed and updated so that the condition rules and priority rules can be changed. Updated data for the condition rules and priority rules may be transmitted from a data center (e.g., the control center 3) to the reception unit 202, and the control unit 210 may be used to update the rules stored in the rule storage unit 215.

The transmission condition determination unit 216 determines the transmission conditions of the travel data based on the communication state determined by the communication state determination unit 213, the vehicle situation identified by the vehicle situation identification unit 212, and the condition rules and priority rules stored in the rule storage unit 215.

For example, when the communication state determination unit 213 determines that the communication state is "good," the transmission condition determination unit 216 may set the image quality of the travel data such as the resolution and the frame rate to the highest levels as the transmission condition. A "good" communication state may mean that the communication speeds are high with relatively low or no delay time. Conversely, a "bad" or "not good" communication state may mean that the communication speeds are low with delay time.

The priority of the data transmitted to the control center 3 for respective data types may be set in a default order, or may be determined based on the condition rules and the priority rules stored in the rule storage unit 215 and set based on the vehicle situation identified by the vehicle situation identification unit 212. The determination of whether the communication state is "good" may be made by the transmission condition determination unit 216, for example, by comparing the value of the communication state such as the communication speed and the delay time with an index value for distinguishing whether the communication state is good or not. On the other hand, when the communication state determined by the communication state determination unit 213 is not good, the transmission conditions such as priority, resolution, and frame rate may be determined based on the condition rules and the priority rules stored in the rule storage unit 215, and based on the vehicle situation identified by the vehicle situation identification unit 212.

The condition rules of FIG. 4 and the priority rules of FIG. 6 may be employed at the same time. For example, when the vehicle situation identification unit 212 identifies the vehicle situation as "straight," with reference to the condition rules of FIG. 4, the transmission conditions for the "front camera image" travel data are determined as having a priority of "1," a resolution of "4K," and a frame rate of "20 fps;" the transmission conditions of the "right camera image" and "left camera image" travel data are determined as having a priority of "2," a resolution of "Full-HD," and a frame rate of "20 fps;" the transmission conditions of the "backward camera image" travel data are determined as having a priority of "3," a resolution of "Full-HD," and a frame rate "10 fps;" and the transmission conditions of the "cabin camera image" travel data are determined as having a priority of "4," a resolution of "HD," and a frame rate of "5 fps."

When the vehicle situation identification unit 212 identifies the vehicle situation as both "straight" and "occupant abnormality," based on the priority rules shown in FIG. 6, the transmission conditions associated with "occupant abnormality" are prioritized over the transmission conditions associated with "straight." For example, there may be a situation where the transmission conditions for the "cabin camera image" are set as the transmission conditions for "occupant abnormality" instead of the transmission conditions for "straight." In such a situation, the priorities for each of the "forward camera image," "left camera image," "right camera image," and "backward camera image" for a "straight" vehicle situation are lowered by one level, while the other transmission conditions such as image resolution and frame rate for the "straight" vehicle situation stay the same. More specifically, the transmission conditions for the "cabin camera image" travel data are based on the "occupant abnormality" vehicle condition and are set to have a priority of "1," a resolution of "4K" and a frame rate of "10 fps." On the other hand, the transmission conditions for the other travel data types are based on the "straight" vehicle situation, where the priority is lowered by one level. In this case, the transmission conditions for the "front camera image" travel data are set to lower the priority from "1" to "2," while the resolution remains at "4K" and the frame rate remains at "20 fps;" the transmission conditions for the "right camera image" and "left camera image" travel data are each lowered from "2" to "3," while the resolutions remain at "Full-HD" and the frame rates remain at "20 fps;" and the transmission conditions of the "backward camera image" travel data are set to lower the priority from "3" to "4," while the resolution remains at "Full-HD" and the frame rate remains at "10 fps."

As the priorities for each of the "front camera image," "left camera image," "right camera image," and "backward camera image" are lowered by one level, the resolutions and frame rates for the travel data may also be lowered by one level. For example, when the condition rules change based on the priority rules, for vehicle situations where the frame rate was originally "20 fps" before the priority was lowered, the frame rate may lower to "10 fps" after the priority is lowered. As a similar example, for vehicle situations where the resolution was "Full-HD" before the priority was lowered, the resolution may lower to "HD" after the priority is lowered.

The transmission data conversion unit 217 converts the travel data according to the transmission condition determined by the transmission condition determination unit 216, and generates the transmission data. The transmission data conversion unit 217 may also be referred to as a data generator 217. The transmission data conversion unit 217 converts the plurality of travel data types into the travel data state determined by the transmission condition determination unit 216 for generating the travel data to be transmitted to the control center 3, and transmits the travel data from the data transmitter 201 to the control center 3 in the order of priority as determined by the transmission condition determination unit 216.

For example, when the vehicle situation is "straight," after the transmission data conversion unit 217 converts the "front camera image" travel data to have a resolution of "4K" and a frame rate of "20 fps," the conversion unit 217 then transmits the "front camera image" travel data to the data transmitter 201 for transmission to the control center 3. Then, the transmission data conversion unit 217 converts the "right camera image" and "left camera image" travel data to have a resolution of "Full-HD" and a frame rate of "20 fps" and then transmits the travel data for the left and right camera images to the data transmitter 201 for transmission to the control center 3. Next, the transmission data conversion unit 217 converts the "backward camera image" travel data to have a resolution of "Full-HD" and a frame rate of "10 fps" and transmits the travel data to the data transmitter 201 for transmission to the control center 3. Finally, the transmission data conversion unit 217 converts the "cabin camera image" travel data to have a resolution of "HD" and a frame rate of "5 fps" and transmits the travel data to the data transmitter 201 for transmission to the control center 3. Even when the frame rate and the resolution of the travel data are not converted, the transmission data conversion unit 217 converts the travel data into a data structure for data transmission, and generates data for transmission (e.g., to the control center 3).

The data for transmission (e.g., to the control center 3) generated by the conversion unit 217 by converting the travel data into a data structure may be referred to as "transmission data." While the transmission data may be travel data that is further processed by the conversion unit 217 (e.g., for transmission to the control center 3), travel data or simply "data" may sometimes be used throughout the specification in place of transmission data. As such, "travel data" or "data" described as "transmitted" (e.g. travel data transmitted to the control center 3) may connote transmission data.

The transmission data conversion unit 217 may be configured to transmit the transmission data in the order of priority determined by the transmission condition determination unit 216. The transmission condition determination unit 216 may determine the order of priority by an amount of the transmission data that can be transmitted within a preset transmission period (i.e., amount of time) that is set based on the speed of the subject vehicle. The preset transmission period may also be referred to as "the data transmission period." The data transmission period may be reduced as the speed of the subject vehicle increases. That is, as the subject vehicle speeds up, the time for transmitting the data may be shortened, because a higher vehicle speed reduces the amount of time that a vehicle situation identified by the vehicle situation identification unit 212 is valid. If a vehicle is travelling at a high rate of speed, the high rate of speed reduces the amount of time the vehicle may be in a position or area where the vehicle situation is valid. The transmission data conversion unit 217 may be configured to readily and variably convert the travel data to generate the transmission data, so that travel data of all types may be readily transmitted within the above-described data transmission period, for example, by adjusting/varying the data quality during the conversion to accommodate the amount of data to be transmitted within the data transmission period. In such cases, the priority transmission condition of the condition rules may be fixed, while the other conditions of the travel data such as the resolution and the frame rate may be varied. The transmission conditions of the condition rules for the travel data with the highest priority may be fixed such that none of the transmission conditions may be varied. When the transmission conditions of travel data are variable, travel data with a lower priority can be made to have a lower resolution and frame rate. That is, the lower the priority level is, the lesser the frame rate and the resolution may be. Lowering the quality of the lower priority transmission data allows the more important and relevant transmission data to have a higher quality and priority, so as to improve the quality of the determinations made by a control center 3 that is using such important and relevant data in a determination operation.

The speed down processor 218 performs a process for reducing the speed of the subject vehicle, when the communication state is less than a minimum for transmitting the transmission data having the highest priority. The minimum communication state permits the travel data having the highest priority to be transmitted with the transmission conditions determined by the determination unit 216 within the data transmission period.

The process for lowering the speed of the subject vehicle may include: a process for controlling the speed and decelerating the subject vehicle via the vehicle control ECU 24; a process for lowering a speed set for the auto-drive function of the subject vehicle via the auto-drive ECU 25; and a process for prompting the driver of the subject vehicle via a notification by the HCU 260 to manually slow the subject vehicle. By causing the subject vehicle to decelerate, the data transmission period becomes longer as the vehicle speed decreases, thereby making it possible to increase the amount of data that can be transmitted within the data transmission period. By using such control, even when the communication state is "bad," the vehicle unit 2 can completely transmit the travel data having the highest priority to the control center 3 within the data transmission period. As such, the vehicle unit 2 allows for a more reliable and complete transmission of the more important and relevant travel data from the subject vehicle to the control center 3.

<Travel Data Transmission Related Process>

The travel data transmission and associated processes are described with reference to FIGS. 7 and 8. The accompanying description to the flowcharts shown in FIGS. 7 and 8 describes processing related to the transmission of the transmission data that is generated by converting the travel data in the communication terminal 20. Such processing may be referred to more simply as a "travel data transmission related process." The communication terminal 20 may be configured to perform the processing shown in FIG. 7 when a power supply to the communication terminal 20 is turned ON. The power supply of the communication terminal 20 may be switched ON and OFF based on the ON/OFF switching of an ignition switch or start switch in the subject vehicle for starting an internal-combustion engine or an electric motor-generator.

On a broad level, the vehicle unit 2 may be configured to perform the processes described with reference to, and illustrated in, FIGS. 7 and 8. More specifically, the communication terminal 20 (i.e. the vehicle communication device 20) may be configured as a microcontroller, SoC, or like microcomputer and configured to perform to perform the processes described with reference to, and illustrated in, FIGS. 7 and 8. Even more specifically, the control unit 210 and communication unit 200 may be configured to perform the processes described with reference to, and illustrated in, FIGS. 7 and 8. At a more specific level, the elements of the control unit 210 and communication unit 200, as described with reference to FIG. 3 may be configured to perform parts of the processes described with reference to, and illustrated in, FIGS. 7 and 8. For example, when the elements of the control unit 210 and communication unit 200 are configured as specialized hardware circuits, the respective elements, as described below in greater detail, may perform the processes described with reference to, and illustrated in, FIGS. 7 and 8. However, it is understood that the processes may generally be performed via an execution of software, by one or more specialized hardware circuits, or as a combination of hardware and software, for example, by the vehicle communication unit 20.

With reference to FIG. 7, at S1, the travel data acquisition unit 214 acquires the travel data. For example, the "front camera image," "left camera image," "right camera image," "backward camera image," and "cabin camera image" may be acquired as the travel data to be transmitted. At S2, the identification information acquisition unit 211 acquires the vehicle situation identifying information. At S3, the communication state determination unit 213 determines the communication state of the subject vehicle with the control center 3.

At S4, the control unit 210 and its components perform a process for determining transmission conditions. The process for determining transmission conditions may be referred to as a transmission condition determination related process. The transmission condition determination related process is described with reference to the flowchart in FIG. 8.

At step S41, the communication state determination unit 213 determines whether the communication speed of the communication state is less than 500 kbps. If the communication state determination unit 213 determines that the communication speed is less than 500 kbps, i.e., "YES" at S41, the communication state determination unit 213 determines that the communication state is not good and the process proceeds to S44. On the other hand, if the communication state determination unit 213 determines that the communication speed is 500 kbps or more, i.e., "NO" at S41, the process proceeds to step S42. Here, a communication speed of 500 kbps is used as an example threshold value for determining whether the communication state is good. This value is merely an example and other threshold values may be used to determine whether the communication state is good.

At S42, the communication state determination unit 213 determines if the delay time in the communication state is longer than 100 ms. If the communication state determination unit 213 determines that the delay time is longer than 100 ms, i.e., "YES" at S42, the communication state determination unit 213 determines that the communication state is not good and the process proceeds to S44. On the other hand, when the communication state determination unit 213 determines that the delay time is 100 ms or less, i.e., "NO" at S42, the communication state determination unit 213 determines that the communication state is good and the process proceeds to step S43. Here, a delay time of 100 ms is used as an example threshold value for determining whether the communication state is good. This value is merely an example and other threshold values may be used to determine whether the communication state is good.

At S43, for the transmission conditions of the travel data, the transmission condition determination unit 216 determines the quality attributes of the travel data such as the resolution and the frame rate (i.e., the attributes of the travel data). For example, the transmission condition determination unit 216 may determine a resolution of "4K" and the frame rate "20 fps" as the transmission conditions of the travel data. The priority for each type of transmission data may be set in a default order, or may be set based on the condition rules and priority rules stored in the rule storage unit 215 and based on the vehicle situation identified by the vehicle situation identification unit 212. After the process at S43, the process returns to the process shown in FIG. 7 and proceeds to S5.

In cases where the communication state determination unit 213 determines a "good" communication state, i.e., "NO" at both S41 and S42, the process at S43 may skip the identification of the vehicle situation at S43 by the vehicle situation identification unit 212 to reduce the processing load (e.g., on the processor of the communication terminal 20). In such cases, the process at S43 may proceed to S5 without identifying the vehicle situation by the vehicle situation identification unit 212.

At S44, if the vehicle situation identified by the identification information acquisition unit 211 at S2 does not indicate an occupant abnormality, i.e., "YES" at S44, the process proceeds to S46. On the other hand, when an occupant abnormality is indicated, i.e., "NO" at S44, the process proceeds to S45. At S45, the vehicle situation identification unit 212 identifies the vehicle situation as "occupant abnormality," and the process proceeds to S46.

At S46, if the vehicle speed in the vehicle situation identifying information acquired by the identification information acquisition unit 211 at S2 is substantially greater than 0 km/h, i.e., "YES" at S46, the process proceeds to S47. On the other hand, if the vehicle speed is substantially equal to 0 km/h or less, i.e., "NO" at S46, the process proceeds to S58. At S47, if the shift position in the vehicle situation identifying information acquired by the identification information acquisition unit at S2 is in the "Drive" (D) range, i.e., "YES" at S47, the process proceeds to S48. On the other hand, if the shift position is not in the D range, i.e., "NO" at S47, the process proceeds to S55.

At S48, if the steering angle in the vehicle situation identifying information acquired by the identification information acquisition unit 211 at S2 is greater than the predetermined range, i.e., "YES" at S48, the process proceeds to S49. On the other hand, if the steering angle is not greater than the predetermined range, "NO" at S48, the process proceeds to S51. At S49, if the current position of the subject vehicle corresponds to the intersection position, i.e., "YES" at S49, the process proceeds to S50. As described above, the current position of the subject vehicle may be determined by the vehicle position and the map data acquired by the identification information acquisition unit 211. On the other hand, if the current position does not correspond to the intersection position, i.e., "NO" at S49, the process proceeds to S54.

At S50, the vehicle situation identification unit 212 identifies the vehicle situation as "right turn," and the process proceeds to S61.

At S51, if the steering angle in the vehicle situation identifying information acquired by the identification information acquisition unit 211 at S2 is smaller than the predetermined range, i.e., "YES" at S51, the process proceeds to S52. On the other hand, when the steering angle is not smaller than the predetermined range, i.e., "NO" at S51, the process proceeds to S54. At step S52, when the current position of the subject vehicle corresponds to the intersection position, "YES" at S52, the process proceeds to S53. On the other hand, if the current position of the subject vehicle does not correspond to the intersection position, i.e., "NO" at S52, the process proceeds to S54. At S53, the vehicle situation identification unit 212 identifies the vehicle situation as "left turn," and the process proceeds to S61.

If the steering angle in the vehicle situation identifying information acquired by the identification information acquisition unit 211 at S2 is neither greater than the predetermined range at S48 (i.e., "NO" at S48) nor less than the predetermine range at S51 (i.e., "NO" at S51), the steering angle is straight. At S54, the vehicle situation identification unit 212 identifies the vehicle situation as "straight," and the process proceeds to S61.

At S55, when the shift position in the vehicle situation identifying information acquired by the identification information acquisition unit 211 at S2 is in the "Reverse" (R) range, i.e., "YES" at S55, the process proceeds to S56. On the other hand, if the shift position is not in the R range, "NO" at S55, the process proceeds to S57. At S56, the vehicle situation identification unit 212 identifies the vehicle situation as "reverse," and the process proceeds to S61.

At S57, the vehicle situation identification unit 212 identifies the vehicle situation as a "detection error," and the process proceeds to S61.

At S58, when the shift position in the vehicle situation identifying information acquired by the identification information acquisition unit 211 at S2 is in the "Park" (P) range, i.e., "YES" at S58, the process proceeds to S59. On the other hand, if the shift position is not in the P range, i.e., "NO" at S58, the process proceeds to S54.

At S59, when the current position of the subject vehicle corresponds to the boarding position. i.e., "YES" at S59, the process proceeds to S60. On the other hand, if the current position of the subject vehicle does not correspond to the boarding position, i.e., "NO" at S58, the process proceeds to S54.

At S60, the vehicle situation identification unit 212 identifies the vehicle situation as "boarding stop," and the process proceeds to S61.

At S61, the transmission condition determination unit 216 determines the priority, the resolution, and the frame rate transmission conditions based on the condition rules and priority rules stored in the rule storage unit 215 and the vehicle situation identified by the vehicle situation identification unit 212.

With reference again to FIG. 7, at S5, the control unit 210 determines whether the most recent transmission conditions determined at S4 are different or have changed from the transmission conditions from earlier or previous transmission condition determinations at S4. If the control unit 210 determines that the transmission conditions have changed, i.e., "YES" at S5, the process proceeds to S6. On the other hand, if the transmission conditions determined at S4 have not changed from the previous transmission conditions determined at S4, i.e., "NO" at S5, the process proceeds to S7. If there are no previous transmission condition determinations, for example, when the communication terminal 20 is initialized after starting the subject vehicle, the process may proceed directly from S4 to S6.

At S6, the transmission data conversion unit 217 changes/updates the transmission conditions determined at S4 to the new transmission conditions.

At S7, the transmission data conversion unit 217 converts the travel data based on the transmission conditions determined by determination unit 216 to generate the transmission data.

At S8, the transmission unit 201 transmits the transmission data generated at S7. When all of the transmission data can be transmitted within the data transmission period, the data transmission process is complete. On the other hand, if the transmission of all the transmission data cannot be performed within the data transmission period, the amount of transmission data that can be transmitted within the data transmission period is transmitted, and the remaining amount of transmission data is terminated when the data transmission period ends (i.e., any data not transmitted by the end of the data transmission period is not transmitted, and the data transmission ends).

At S9, when the communication terminal 20 determines that the travel data transmission related process is done, i.e., "YES" at S9, the travel data transmission related process is terminated. On the other hand, when the communication terminal 20 determines that the travel data transmission related process is not done, i.e., "NO" at S9, the process returns to S1 to repeat the process from the beginning. The communication terminal 20 may determine that the travel data transmission related process is done, for example, when the power switch of the subject vehicle is turned OFF.

Figure 8:
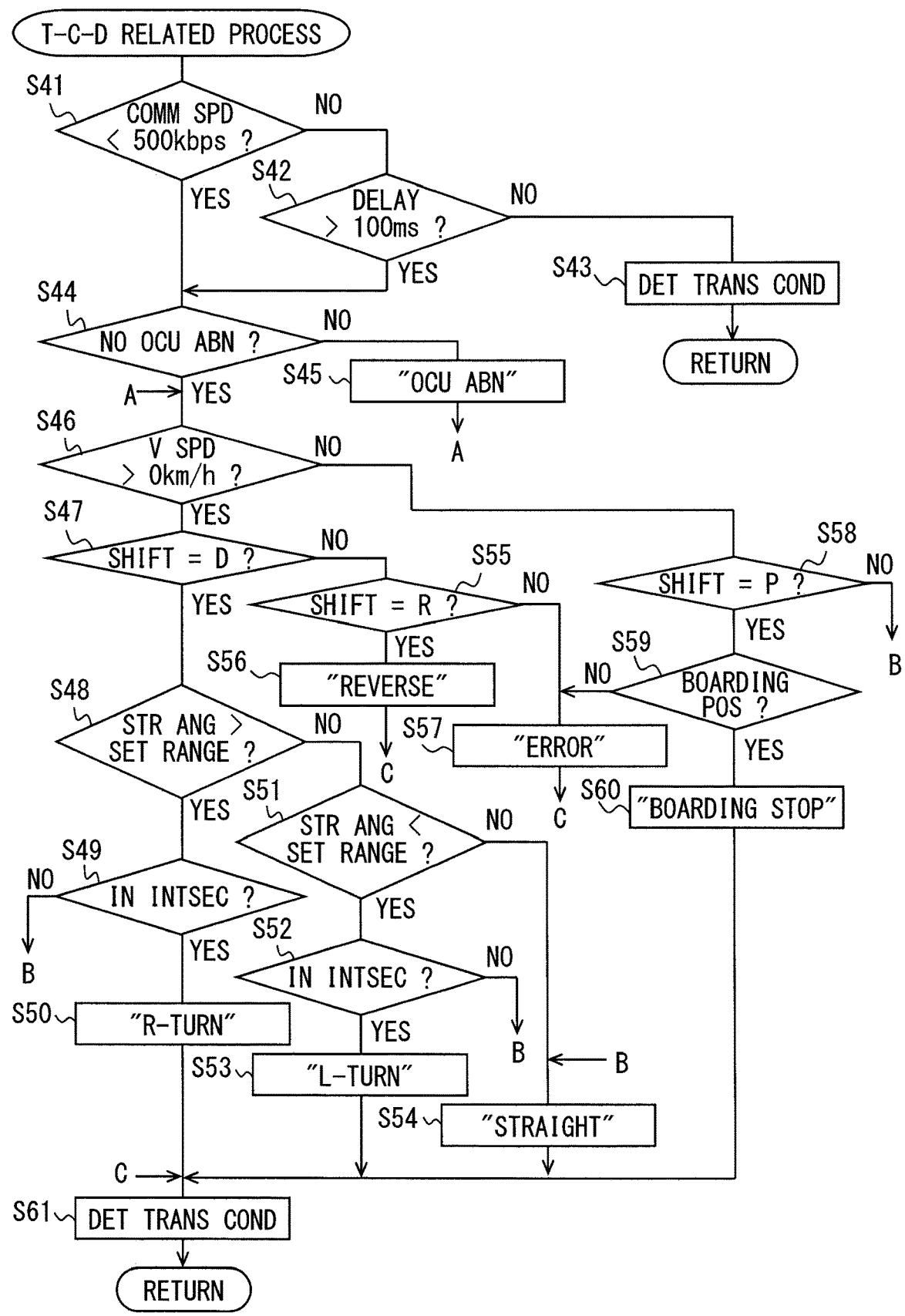
FIG. 8 is a flowchart of a transmission condition determination transmission process.

The sequences of the of the travel data transmission related process shown in FIG. 7 and the transmission condition determination related process shown in FIG. 8 are not limited to the orders shown in the flowcharts of FIGS. 7 and 8. The communication terminal 20 may be configured to perform the processes in a different order than what is shown in FIGS. 7 and 8. Similarly, the travel data transmission related process shown in FIG. 7 is not limited to beginning when the start switch/ignitions switch of the subject vehicle is turned ON and the communication terminal 20 receives a power supply. For example, the travel data transmission related process may be triggered by a driving situation such as when the subject vehicle enters an intersection, or when the subject vehicle approaches a boarding location (e.g., a bus stop). The communication terminal 20 may determine when the subject vehicle enters an intersection or approaches a boarding location by using information on a planned travel route and comparing it to the position of the subject vehicle.

In the present embodiment, the vehicle situation identification unit 212 identifies "straight," "right turn," "left turn," "reverse," "boarding stop," and "occupant abnormality" as the vehicle situations. However, the vehicle situations are not necessarily limited to these examples. For example, the vehicle situation identification unit 212 may be configured to identify other vehicle situations based on the vehicle situation identifying information acquired by the identification information acquisition unit 211, or may also be configured to further divide the above-described vehicle situations into smaller vehicle situations to further fine tune the above-described vehicle situations.

For example, as described above with references to FIGS. 7 and 8, if the steering angle in the vehicle situation identifying information acquired by the identification information acquisition unit 211 at S2 is neither greater than the predetermined range at S48 (i.e., "NO" at S48) nor less than the predetermine range at S51 (i.e., "NO" at S51), the steering angle is straight. However, the vehicle situation identification unit 212 may determine that a vehicle changing lanes is a "straight" vehicle situation, because the steering angle for changing lanes is not enough to indicate a left or right turn. In this case, the vehicle situation identification unit 212 may be configured to identify another vehicle situation from the "straight" vehicle situation to determine that the subject vehicle is changing lanes (i.e., "lane change"). In such a case, the condition rules for the travel data associated with a "lane change" vehicle situation may be changed from the condition rules for a "straight" vehicle situation. For example, camera images for the lane into which the subject vehicle is switching may be important/relevant travel data for the control center 3, and the condition rules for the camera capturing the image data may be configured to have a higher priority and a higher quality.

As another example, the vehicle situation identification unit 212 may further divide a vehicle situation into smaller vehicle situations to identify additional vehicle situations. For example, the vehicle situation identification unit 212 may divide the straight travel of the subject vehicle into: (i) a straight travel situation immediately before the subject vehicle enters an intersection where the subject vehicle will turn right or left; and (ii) a straight travel situation immediately after the subject vehicle exits the intersection where the subject vehicle has made a turn. Such a vehicle situation is described with reference to FIG. 9, where the subject vehicle makes a left turn at an intersection. FIG. 9 illustrates a vehicle situation for an auto-drive vehicle making a left turn at an intersection where the transmission data is switched from one type to another. The backward camera 220d and cabin camera 261 are not shown in FIG. 9, but the vehicle shown in FIG. 9 may include a backward camera 220d and a cabin camera 261.

Here, in instances where the control center 3 may need to determine whether a left turn by the auto-drive vehicle can be performed at an intersection, captured images from the field watch camera 220 and cabin camera 261 may be transmitted from the vehicle unit 2 to the control center 3. In this example, an auto-drive operation by the subject vehicle as controlled by the control center 3 may be prompted by the ECU 25 misidentifying an object near a crosswalk of an intersection as a pedestrian, where such misidentification interrupts the subject vehicle under the control of the auto-drive ECU 25 from passing through the intersection.

Before the subject vehicle enters the intersection for the left turn, it may be important to avoid contact with any objects or obstacles on the left as the subject vehicle is driving straight into the intersection. As such, the vehicle unit 2 may transmit a higher quality "left camera image" from the left side camera 220b to the control center 3, where the travel data for the "left camera image" has a higher quality (e.g., resolution and frame rate) and priority, even though the subject vehicle is still in a "straight" driving situation.

When the auto-drive vehicle enters the intersection and starts to make a left turn, it is important to avoid contact with objects and obstacles on the left side of the subject vehicle and in front of the subject vehicle. As such, the vehicle unit 2 may transmit both a higher quality "front camera image" from the front camera 220a and a higher quality "left camera image" from the left side camera 220b to the control center 3, where the travel data for both the "front camera image" and the "left camera image" has a higher image quality and priority.

Then, after exiting from the intersection when the auto-drive vehicle travels begins to travel straight again, avoiding contact with objects and obstacles in front of the subject vehicle is important/relevant. As such, the vehicle unit 2 may transmit a higher quality "front camera image" from the front camera 220a to the control center 3, where the travel data for the "front camera image" has a higher quality and priority.

The DSM may also detect orientation of the driver's face to determine the driver's line of sight and determine where the driver is looking. As such, the priority and quality of images captured by the cameras in the direction(s) the driver is not looking may increase, and the transmission conditions may be changed accordingly by the transmission condition determination unit 216.

Summary of the First Embodiment

In the configuration of the first embodiment, the quality and priority of a plurality of different travel data types can be selectively switched by the vehicle unit 2 based on the vehicle situation identified by using the vehicle state of the subject vehicle. In such manner, the vehicle unit 2 can generate high priority and highly quality travel data and prioritize the transmission of such travel data to the control center 3, where such travel data may be relevant and important for an auto-drive control of the subject vehicle performed by the control center 3.

As such, it is possible for the vehicle unit 2 to generate transmission data from important/relevant travel data for prioritized transmission of such data to the control center 3. By transmitting such data to the control center 3, important/relevant data can be transmitted to the control center 3 in a prioritized manner based on the vehicle situation.

Since the vehicle situation is identified by using not only the vehicle state but also the travel route information, it is possible to better identify the vehicle situation and to more accurately transmit the important data to the control center 3 in a prioritized manner.

Since the transmission condition is determined not only based on the vehicle situation but also the communication state, the transmission condition can be changed based on the communication state. For example, by switching the quality of the different travel data types based on the communication state, it is possible to change the travel data being transmitted (i.e., the transmission data) to maximize the amount of data that can be transmitted.

Since the priority of the travel data used to generate the transmission data is changed (i.e., switched) instead of changing the types of travel data used to generate the transmission data, the transmission conditions can be better adjusted for transmitting important data to the control center 3 while maximizing the amount of data that can be transmitted without necessarily limiting the types of travel data that can be transmitted. For example, the amount of transmission data and types of transmitted travel data (i.e., transmission data) may be changed when changing the data priority by decreasing the data amount for certain data types but not decreasing the amount of data types.

As such, the vehicle unit 2 with the communication terminal 20 in the present embodiment enables the control center 3 to more reliably and accurately control an auto-drive function of the subject vehicle by prioritizing the transmission of the more important and relevant data to the control center 3 for controlling the auto-drive function of the subject vehicle.

Second Embodiment

In the first embodiment, both the vehicle state and the travel route information are used to identify the vehicle situation. In the present embodiment, the configuration of the first embodiment may be modified so that the vehicle situation can be identified without using the travel route information.

Third Embodiment

In the first embodiment, the transmission condition can be determined based on both the vehicle situation and the communication state. In the present embodiment, the configuration of the first embodiment may be modified so that the transmission condition may be determined without using the communication state. In such cases, the communication state determination unit 213 may be omitted from the control unit 210.

Fourth Embodiment

In the first embodiment, the speed down processor 218 is configured to perform a speed reduction process for reducing the speed of the subject vehicle when the communication state determined by the communication state determination unit 213 is less than the minimum communication state. However, such a configuration may be modified. In the present embodiment, the configuration of the first embodiment may be modified so that when the control unit 210 does not include the speed down processor 218 and the communication state is less than the minimum communication state, the process for reducing the speed of the subject vehicle is not performed.

Fifth Embodiment

In the first embodiment, the condition and priority rules stored in the rule storage unit 215 are configured to be updatable. In the present embodiment, the configuration of the first embodiment may be modified so that the condition rules and priority rules stored in the rule storage unit 215 are not updated. In other words, the condition rules and priory rules in the present embodiment may be fixed.

Sixth Embodiment

In the first embodiment, the priority rules are stored in the rule storage unit 215, and the transmission conditions are determined by using the priority rules along with other rules. In the present embodiment, the configuration of the first embodiment may be modified so that the priority rules are not stored in the rule storage unit 215, and the transmission conditions can be determined without using the priority rules. In such cases, the transmission conditions may be determined not only by condition rules that associate transmission conditions with a single vehicle situation, but also by condition rules that associate transmission conditions with a plurality of vehicle situations (e.g., as a combination of different vehicle situations).

Seventh Embodiment

In the first embodiment, the communication terminal 20 (i.e., the vehicle communication device 20) may be used in an auto-drive application for automatically controlling (e.g., driving) the subject vehicle. In the present embodiment, the vehicle unit 2 and communication terminal 20 (i.e., the vehicle communication device 20) are also applicable to non-auto-driving functions and may be installed in vehicles that cannot be controlled automatically. In such cases, the control center 3 or like data collection center in a vehicle network may use the travel data from the subject vehicle, for example, to monitor the operations of a subject vehicle and generate a three-dimensional map.

The various embodiments described herein are not limited to a vehicle communication device realized as either an apparatus or system, but also include the functions and processes performed by such devices and systems. For example, the processes and functions associated with such devices and systems may include and be realized as one or more methods for vehicle communication. When such methods for vehicle communication are encoded on one or more non-transitory storage media (e.g., memory) that include instructions that when executed by a processor in the vehicle communication device causes the vehicle communication device to perform the vehicle communication methods, such methods may be realized as computer program products for vehicle communication.

The present disclosure is not limited to the embodiments described above, and various modifications may be implemented without departing from the spirit of the present disclosure. For example, the various embodiments described in the present disclosure may be combined with one another, unless otherwise indicated, where such combinations may include more elements and features than the original embodiments, or less elements and features than the elements and features included in the original embodiments.

What is claimed is:

1. A vehicle communication device for use in a vehicle, the vehicle communication device comprising:
   a data acquisition unit configured to acquire, using a processor, travel data during a travel of the vehicle;
   a data converter configured to generate, using a processor, transmission data for transmission to a data center by converting the travel data based on a transmission condition; and
   a data transmitter configured to transmit the transmission data generated by the data converter to the data center, wherein
   the data acquisition unit is further configured to acquire a plurality of different travel data types based on a vehicle situation, and wherein
   the transmission condition includes a transmission priority and one or more attributes of the travel data, and wherein
   the data converter is further configured to raise the transmission priority of any of the plurality of different travel data types to generate prioritized travel data for any of the plurality of different travel types based on a data center necessity level, and to prioritize the transmission priority of the transmission data generated from the prioritized travel data, and wherein
   the transmission priority of each travel data type is based at least partially on the vehicle situation.

2. The vehicle communication device of claim 1, wherein the data converter is further configured to generate the transmission data from the travel data based on the vehicle situation and by changing the transmission priority of the transmission condition, and wherein the vehicle situation is identified by using travel route information of the vehicle.

3. The vehicle communication device of claim 1, wherein the data converter is further configured to generate the transmission data from the travel data based on a communication state of communications between the vehicle and the data center, and by changing the one or more attributes of the travel data.

4. The vehicle communication device of claim 3 further comprising:
   a speed down processor configured to reduce a speed of the vehicle when the communication state does not satisfy a minimum requirement for transmitting the transmission data that includes the prioritized travel data.

5. The vehicle communication device of claim 1 further comprising:
a rule storage unit configured to store condition rules that specify correspondence relationships between vehicle situations and transmission conditions for the plurality of different travel data types, wherein
the data converter is further configured to generate the transmission data based on the condition rules stored in the rule storage unit, and wherein
the condition rules stored in the rule storage unit are updatable.

6. The vehicle communication device of claim 5, wherein
the rule storage unit is further configured to store priority rules for a plurality of different vehicle situations, a priority rule for the vehicle situation specifying a priority of the vehicle situation, and wherein
the data converter is further configured to generate the transmission data by prioritizing the transmission condition associated with a higher priority vehicle situation based on the condition rules stored in the rule storage unit, in response to the data converter determining the transmission condition based on the condition rules stored in the rule storage unit based on the vehicle situation.

7. The vehicle communication device of claim 1, wherein
the data acquisition unit is further configured to acquire images captured from a plurality of image capture devices in and on the vehicle, each of the plurality of image capture devices positioned in different capture directions from other image capture devices, each of the plurality of different travel data types associated with images captured by one of the plurality of image capture devices, and wherein
the data converter is further configured to generate the transmission data based on the vehicle situation, wherein the transmission data is generated by changing the transmission priority of the captured image based on a necessity level of the captured image determined by the data center, and wherein
the vehicle is an auto-drive vehicle configured to perform automatic acceleration, automatic breaking, and automatic steering as auto-drive functions of the vehicle, and wherein
the data center is a control center configured to control the auto-drive functions of the vehicle based on the transmission data transmitted by the data transmitter.

8. A computer program product for vehicle communication encoded on one or more non-transitory computer storage media that include instructions that when executed by a processor in a vehicle communication device causes the vehicle communication device to perform operations comprising:
acquiring travel data from a vehicle during travel of the vehicle, the travel data including a plurality of different travel data types;
generating transmission data for transmission to a data center, the transmission data generated from the travel data based on transmission conditions including a transmission priority and one or more attributes of the travel data;
increasing the transmission priority of any of the plurality of different travel data types by generating prioritized travel data for any of the plurality of different travel types based on a data center necessity level;
determining the transmission priority of the transmission data generated from the prioritized travel data; and
transmitting the transmission data to the data center,
wherein the transmission priority of each travel data type is based at least partially on a vehicle situation.

9. The computer program product of claim 8, wherein:
the plurality of different travel data types include a forward camera image and a backward camera image;
vehicle situations include a straight situation and a reverse situation;
the forward camera image has a more important priority than the backward camera image in a straight situation; and
the backward camera image as a more important priority than the forward camera image in a reverse situation.

10. A travel data collection system comprising:
a processor; and
a non-transitory computer-readable storage medium including instructions that, when executed cause the following steps to be performed:
acquire travel data;
acquire vehicle situation identifying information;
determine a communication state of a subject vehicle with a control center;
determine a transmission condition;
determine whether or not the transmission condition has changed;
upon a determination that the transmission condition has changed, update a stored transmission condition;
generate transmission data based on transmission conditions; and
transmit the transmission data,
wherein a transmission priority of each travel data type is based at least partially on a vehicle situation.

11. The travel data collection system of claim 10, wherein determining the communication state of the subject vehicle with the control center includes:
determining that the communication state is good when (i) a communication speed is greater than or equal to a communication speed threshold or (ii) a delay is less than or equal to a delay threshold.

12. The travel data collection system of claim 10, wherein determining the communication state of the subject vehicle with the control center includes:
determining that the communication state is NOT good when (i) a communication speed is less than a communication speed threshold, and/or (ii) a delay is greater than a delay threshold, and
determining the vehicle situation.

13. The travel data collection system of claim 12, wherein determining the vehicle situation includes selecting the vehicle situation from a set of vehicle situations including: straight, right turn, left turn, reverse, boarding stop, and occupant abnormality.

14. The travel data collection system of claim 13, wherein travel data types include: a forward camera image, a right camera image, a left camera image, a backward camera image, and a cabin camera image.

15. The travel data collection system of claim 14, wherein:
if the selected vehicle situation is straight, then the forward camera image has a highest priority relative to all non-selected vehicle situations;
if the selected vehicle situation is right turn, then the right camera image has the highest priority relative to all non-selected vehicle situations;
if the selected vehicle situation is left turn, then the left camera image has the highest priority relative to all non-selected vehicle situations;

if the selected vehicle situation is reverse, then the backward camera image has the highest priority relative to all non-selected vehicle situations; and if the selected vehicle situation is occupant abnormality, then the cabin camera image has the highest priority relative to all non-selected vehicle situations.

16. The travel data collection system of claim 14, wherein:

if the selected vehicle situation is boarding stop, and the subject vehicle is driving on a left side of a road, then the left camera image has the highest priority relative to all non-selected vehicle situations; and if the selected vehicle situation is boarding stop, and the subject vehicle is driving on a right side of the road, then the right camera image has the highest priority relative to all non-selected vehicle situations.

* * * * *